United States Patent Office 3,043,609
Patented July 10, 1962

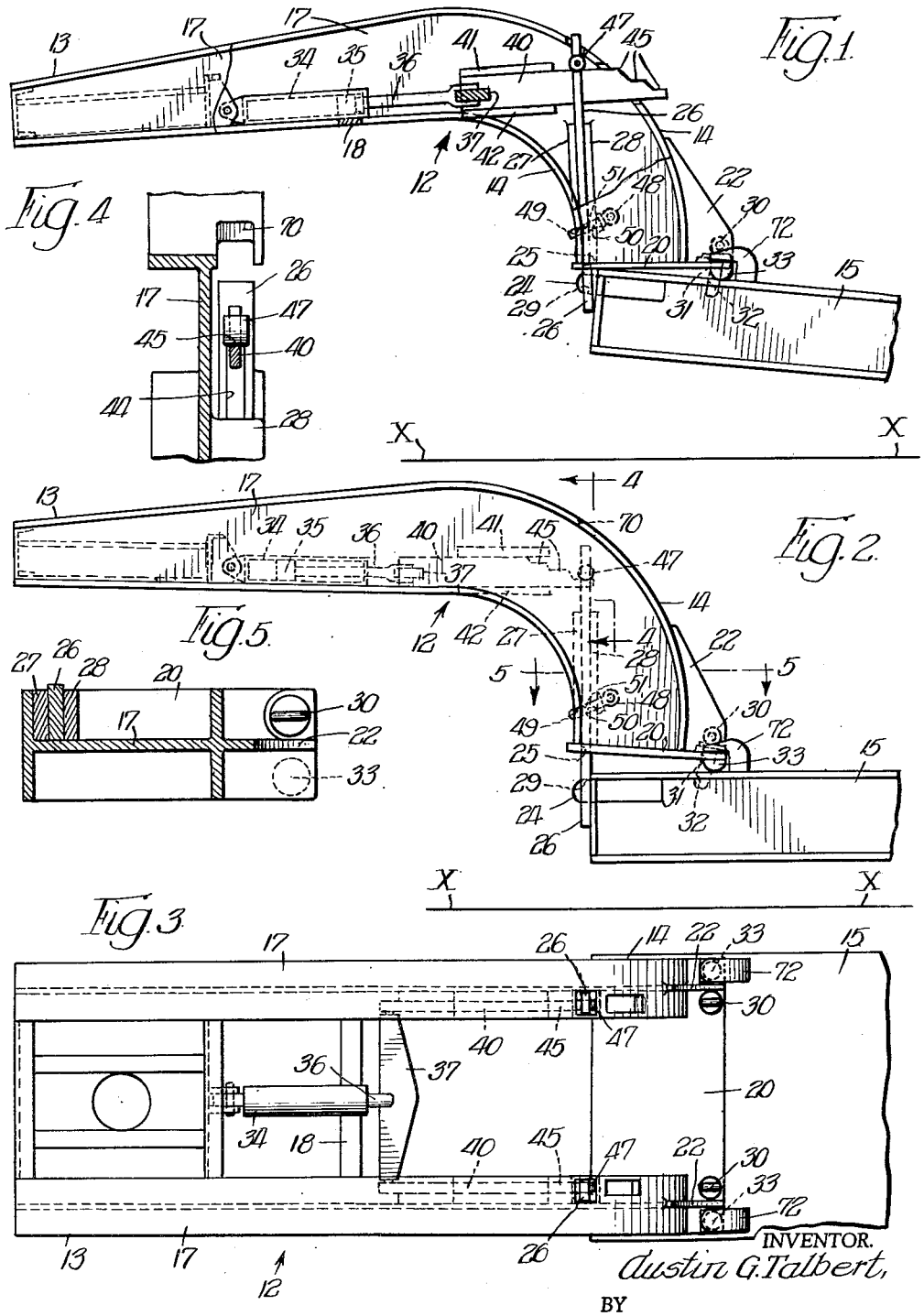

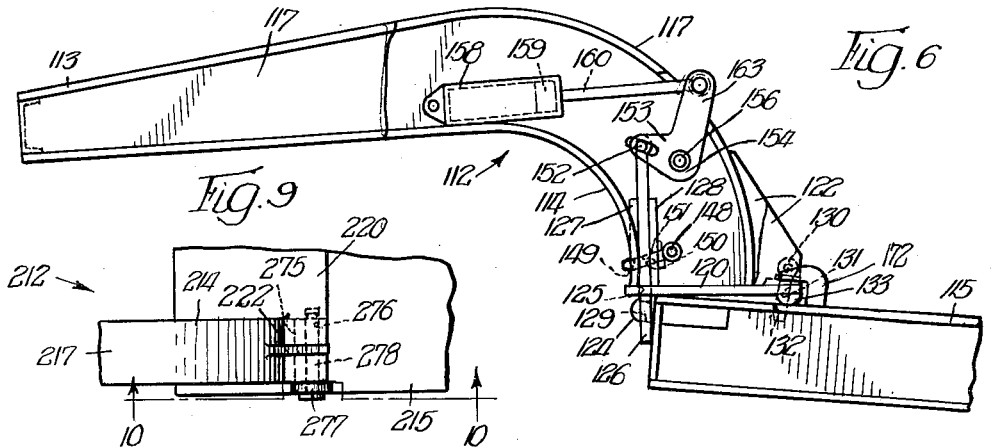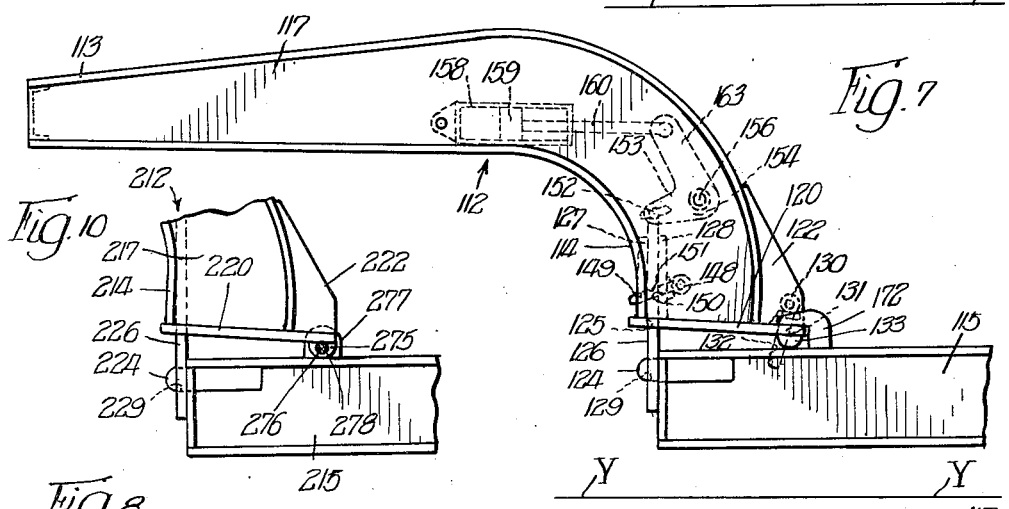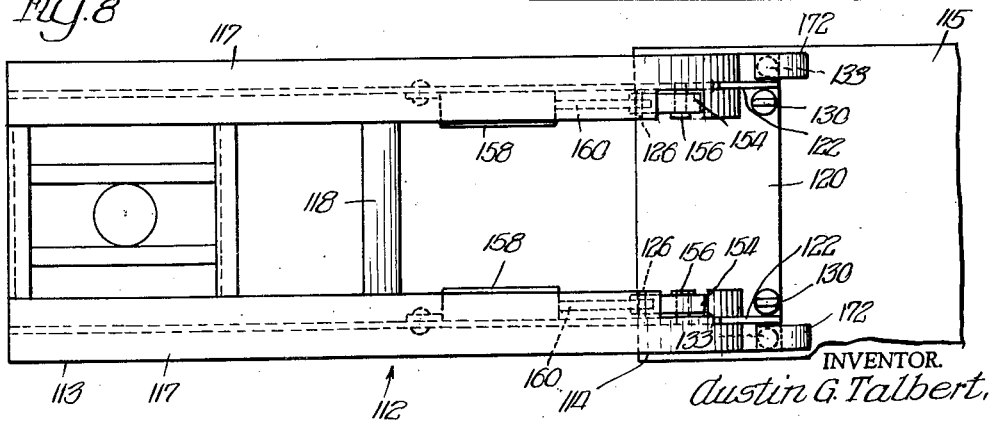

3,043,609
REMOVABLE GOOSENECK DRAWBAR HAVING AN ADJUSTABLE CONNECTION WITH A LOW-BED TRAILER
Austin G. Talbert, Lyons, Ill., assignor to Talbert Construction Equipment Company, Lyons, Ill., a corporation of Illinois
Filed Mar. 2, 1959, Ser. No. 796,353
9 Claims. (Cl. 280—423)

The present invention relates generally to a removable drawbar of the gooseneck type adapted for interconnecting the forward end of a low-bed trailer having rear support wheels only and a tractor for transporting the trailer and its load cross-country.

Gooseneck-type drawbars for interconnecting a trailer and tractor have been previously developed and several are illustrated in my patents, Nos. 2,489,112, dated November 22, 1949, 2,613,945, dated October 14, 1952, and 2,667,363, dated January 26, 1954. In connecting tractors and low-bed trailers with gooseneck-type drawbars, two difficulties are frequently encountered. One difficulty results from the load on the trailer, such as power shovels, cranes, etc., being carried too high for overhead obstructions, and the other difficulty results from the forward end of the trailer being disposed too close to the pavement for clearing obstructions encountered in railroad track crossings and the like. Previous efforts to design a connecting structure for a tractor and low-bed trailer which eliminates these two difficulties have not been entirely successful and it is, therefore, the general object of the present invention to provide a gooseneck drawbar structure in which the forward end of the trailer can be vertically adjusted in transit to take care of varying conditions.

An important object of the invention is to provide a new and improved gooseneck drawbar structure wherein a specially designed connection is provided between the drawbar and the forward end of a low-bed trailer which permits selective raising and lowering of the forward end of the trailer relative to the downwardly curved rear end of the gooseneck drawbar.

Another important object of the invention is to provide a tractor-gooseneck-trailer combination vehicle of the character described wherein the forward end of the trailer may be adjustably raised and lowered selectively by the driver of the tractor from the tractor cab during cross-country transit of the vehicle.

A more detailed object of the invention is to provide a new and improved tractor-gooseneck-trailer combination of the character described wherein the forward end of the trailer is provided with a pair of forwardly extending members adapted to project through openings formed in a pair of plates which are mounted for vertical movement on and relative to the downwardly curved rear portion of the gooseneck and wherein the plates may be vertically adjusted relative to the gooseneck by hydraulic power devices interconnected with the plates by suitable means such as cams, rocker arms, etc.

Another object of the invention is to provide an improved gooseneck structure of the character described which is simple and economical to fabricate, which is sturdy and requires little or no maintenance, and which is simple and efficient in operation.

For a more complete understanding of the nature and scope of the invention, reference may be had to the accompanying drawings wherein:

FIG. 1 is a side elevational view of one embodiment of the invention, with a portion of the near side beam broken away, showing the rear end of a gooseneck drawbar connected to the forward end portion of a low-bed trailer and showing the forward end of the trailer in its raised position;

FIG. 2 is a side elevational view of the apparatus shown in FIG. 1 with the forward end of the trailer in its lowered position;

FIG. 3 is a top plan view of the apparatus as shown in FIG. 2;

FIG. 4 is an enlarged vertical section taken generally on the line 4—4 of FIG. 2;

FIG. 5 is an enlarged horizontal section taken generally on the line 5—5 of FIG. 2;

FIG. 6 is a side elevational view similar to FIG. 1, with a portion of the near side beam broken away, showing another form of the invention with the forward end of the trailer in its raised position;

FIG. 7 is a side elevational view of the device shown in FIG. 6 with the forward end of the trailer in its lowered position;

FIG. 8 is a top plan view of the device as shown in FIG. 7;

FIG. 9 is a fragmentary top plan view showing one side of the rear end of a gooseneck drawbar connected to the forward end of a trailer and illustrating particularly a modification providing a separable pivotal connection between the rearmost portion of the gooseneck and the deck of the trailer; and FIG. 10 is a vertical section taken generally on the line 10—10 of FIG. 9.

Referring first to the embodiment of the invention shown in FIGS. 1–5, inclusive, a gooseneck drawbar 12 is provided having a horizontally extending forward portion 13 adapted to be connected to a fifth wheel of a tractor in a manner well known in the art and a downwardly curved rear portion 14 adapted to be releasably connected to the forward end of a low-bed trailer 15 of the well-known type having rear support wheels only.

The gooseneck drawbar 12 may be formed in any suitable manner. In the embodiment shown in the drawings, it comprises a pair of longitudinally extending, laterally spaced side beams 17—17, preferably wide flange I-beams, which are formed in the shape of a gooseneck and which are rigidly interconnected by suitable cross members, such as a cross brace 18, FIG. 3. A flat plate 20 is secured across the bottom ends of the downwardly curved rear portions of the side beams 17—17 and extends somewhat to the rear thereof. A pair of vertical brace members or gussets 22—22 are rigidly secured between the side beams 17—17 and the flat plate 20.

The forward end 13 of the gooseneck 12 is adapted to be releasably connected to the rear end of a tractor by means of a fifth wheel structure of a type well known in the art. Reference may be had to my patent, No. 2,489,-112, dated November 22, 1949, which discloses such a fifth wheel arrangement including latch means for releasably attaching the forward end of the gooseneck to the fifth wheel and means mounting the fifth wheel on a shaft extending transversely of the tractor whereby to permit forward and rearward tilting of the fifth wheel. Since the structure does not comprise any part of the invention, it is not shown nor described in detail.

The low-bed trailer 15 is provided with suitable means, such as a pair of laterally spaced forwardly projecting members or pins 24—24, on its forward end for coupling engagement with the rear end 14 of the gooseneck 12 in a manner to be described.

A connector plate 26 is mounted adjacent the forward inner flange of the rear portion 14 of each side beam member 17 for generally vertical sliding movement between a pair of vertically extending, spaced guide members 27 and 28 which are rigidly secured to each side beam 17. The lower ends of the connector plates 26—26 extend downwardly through suitable openings 25 formed in the flat plate 20 and are provided themselves with openings 29 into which the pins 24 on the forward end of the trailer 15 are adapted to be inserted whereby to support the forward end of the trailer 15 on the rear end of the gooseneck 12. The coupling connection between the rear end of the gooseneck 12 and the trailer 15 also includes a pair of pins 30—30 disposed one at each side of the rear end of the gooseneck 12 and adapted to be inserted through aligned openings 31 and 32 formed respectively in the flat plate 20 and in the bed of the trailer 15. With a coupling arrangement such as has been disclosed, the flat plate 20 which is secured across the lower ends of the side beams 17 extends generally over a portion of the forward end of the bed of the trailer 15. A pair of hemispherical bearing bosses 33—33 are secured to the underside of the flat plate 20 one at each rear corner thereof and are engageable with the bed of the trailer 15 for purposes to be explained hereinafter.

Provision is made for vertically moving the connector plates 26—26 relative to the rear portion of the gooseneck 12 either to raise the forward end of the trailer 15 to the position shown in FIG. 1 or to lower the forward end of the trailer 15 to the position shown in FIG. 2. The ground or pavement level in FIGS. 1 and 2 is indicated by a reference line X—X. Upon raising or lowering the connector plates 26—26, the forward end of the trailer 15 pivots about its rear support wheels. Because the bearing bosses 33—33 are positioned somewhat rearwardly of the connection between the plates 26—26 and the pins 24—24, such upward pivoting movement of the front end of the trailer 15 about the fixed axis of its rear support wheels exerts an upward force on the bosses 33—33 and raises the rear end portion 14 of the gooseneck 12 a relatively small distance. This slight pivoting movement of the gooseneck 12, which may be noted by a comparison of FIGS. 1 and 2, is permitted because of the mounting of the fifth wheel of the tractor for tilting movement about an axis extending transversely of the tractor, as has been previously discussed herein. Although the forward end portion 13 of the gooseneck 12 is attached to the fifth wheel, the tiltable mounting of the fifth wheel permits tilting of the rear end portion 14 of the gooseneck 12 about its forward end portion 13.

The low-bed type trailers described herein are well adapted for transporting heavy construction equipment such as power shovels, cranes, etc., for two basic reasons. First, it is comparatively simple to load such equipment onto the lowered front ends of such trailers and, second, the equipment when loaded is supported relatively close to the ground. This second feature may be of considerable importance particularly in cases where such construction equipment is extremely tall and thus difficult to transport along streets and highways due to overhead obstacles. The vertically adjustable connection between the gooseneck 12 and the forward end of the trailer 15 provided herein permits even further lowering of the forward end of the trailer 15 below its normal transit position and thus allows additional clearance for transit of a loaded trailer through underpasses, etc. Another difficulty sometimes encountered with low-bed trailers when in their normal transit positions results from the forward end of the trailer being disposed too close to the pavement for clearing obstructions encountered in railroad track crossings and the like. The structure provided herein permits raising the forward end of the gooseneck 12 above its normal transit position and thereby allows additional under-clearance for the forward end of the trailer 15.

In the form of the invention shown in FIGS. 1, 2 and 3, a hydraulic power cylinder 34 is suitably mounted on the gooseneck 12 forwardly of the connector plates 26—26 and is provided with a piston 35 having a piston rod 36, the outer end of which piston rod is suitably connected to a cross arm 37 which extends laterally between the two side beams 17—17. A pair of rams 40—40 are disposed one each between the innermost, upper and lower flanges of each side beam 17 and are mounted for slidable movement forwardly and rearwardly of the gooseneck 12 between vertically spaced, horizontally extending guide members 41 and 42 rigidly secured to each side beam 17. The forwardly disposed end of each ram 40 is suitably connected to an end of the cross arm 37 whereby actuation of the power cylinder 34 results in simultaneous movement of the two rams 40—40 either forwardly or rearwardly of the gooseneck 12. The rearwardly disposed end of each ram 40 extends through a vertical slot 44 formed in the upper end of each connector plate 26 and is provided on its upper surface with a series of vertically stepped cam surfaces 45. It is thus seen that each connector plate 26 is supported on the gooseneck 12 through engagement of the upper end of the slot 44 with the upper cam surfaces 45 of its associated ram 40. As each ram 40 is moved progressively rearwardly, its connector plate 26 is progressively raised through engagement thereof with the stepped cam surfaces 45, the connecting surfaces between the vertically stepped surfaces 45 being suitably inclined. Conversely, forward movement of each ram 40 provides progressive lowering of its associated connector plate 26. Preferably, a roller 47 is rotatably mounted in the upper end of the slot 44 in each connector plate 26 for engagement wtih the cam surfaces 45 of each ram 40 whereby to facilitate raising and lowering of each connector plate 26.

If desirable, the single power cylinder 34 and cross arm 37 may be replaced by an arrangement wherein a separate power cylinder is provided for each ram 40. Such an arrangement is shown in FIGS. 6, 7 and 8 and will hereinafter be described. The controls for the power cylinder 34, which are conventional, are preferably located in the cab of the tractor whereby the driver may raise or lower the forward end of the trailer 15 relative to the gooseneck 12 without even bringing the tractor to a stop.

As it may be desirable to transport the trailer 15 for long distances with the forward end thereof in either its raised, lowered, or normal transit positions relative to the gooseneck 12, a locking pin 48 is provided for each connector plate 26. The locking pins 48—48 are adapted to be inserted through aligned openings 49 and 50 formed, respectively, in the vertical guide members 27 and 28 and through one of a series of vertically spaced openings 51 formed in each connector plate 26.

The operation of this device is extremely simple. The driver in the cab merely actuates the power cylinder 34 by conventional controls to shift the rams 40 either rearwardly, whereby the connector plates 26 and the forward end of the trailer 15 are raised relative to the gooseneck 12, or forwardly, whereby the connector plates 26 and the forward end of the trailer 15 are lowered relative to the gooseneck 12.

A modified form of the invention is shown in FIGS. 6, 7 and 8. This form differs from the form of the invention illustrated in FIGS. 1 to 5 as to the means for raising and lowering the forward end of the trailer. In all other respects the apparatus is the same and, therefore, the structural elements of this modified form of the invention which correspond exactly to structural elements of the first-described form of the invention are identified by the same reference numerals plus 100, while those elements which differ are identified by different reference numerals.

The connector plates 126 which are slidable on the gooseneck 112 in a vertical direction between guides 127 and 128 are somewhat shorter in length than the connector plates 26 of the first embodiment. Each plate 126 is pivotally connected at its upper end by a pin-andslot arrangement, indicated at 152, to an arm 153 of an angular, two-arm rocker member 154 which is preferably in the form of a bell crank member. Each rocker member 154 is pivotably mounted on a stub shaft 156 which is secured to the vertical web of one of the side beams 117, between the inner flanges thereof.

A pair of hydraulic power cylinders 158—158 are mounted each on one of the side beams 117 between the inner flanges thereof and forwardly of the pivotable mountings of the rocker members 154. Each cylinder 158 is provided with a piston 159 having a piston rod 160. The outer ends of the piston rods 160 are connected one each to the other arm 163 of the rocker members 154 whereby rearward movement of the piston rods 160 pivots the rocker members 154 clockwise, as viewed in FIGS. 6 and 7, to raise the connector plates 126 and thus the forward end of the trailer 115. Conversely, forward movement of the piston rods 160 pivots the rocker arms 154 counterclockwise, as viewed in FIGS. 6 and 7, to lower the connector plates 126 and thus the forward end of the trailer 115 relative to the rear end of the gooseneck 112 and toward the pavement or ground level which is indicated in FIGS. 6 and 7 by a reference line Y—Y.

The pair of power cylinders 158—158 could be replaced by an arrangement similar to the single power cylinder 34 and cross arm 37 of the first form of the invention shown in FIGS. 1 to 5 inclusive. Conventional controls for the power cylinders 158 are preferably located in the cab of the tractor whereby the driver thereof may adjustably raise and lower the forward end of the trailer 115 relative to the gooseneck 112 during cross-country transit of the trailer and its load.

Locking pins 148, which are identical to the locking pins 48 of the first-described form of the invention, are provided for locking the connector plates 126 in either their raised, lowered or normal transit positions relative to the gooseneck 112.

The modified form of the invention operates in the same manner as the first-described form except that the connector plates 126 are raised and lowered by the rocker members 154 instead of by the cam rams 40 of the first-described form of the invention.

In both forms of the invention described herein, portions of the flanges of the side beams 17—17 and 117—117 may be removed to insure non-interference with the movement of the connector plates 26 and the rams 40 in the first form of the invention and non-interference with the pivoting movement of the rocker members 154 in the second form of the invention. For example, in FIG. 4 an opening 70 is shown in the top flange of one of the side beams 17 whereby to permit movement therethrough of one of the connector plates 26.

Also, in both forms of the invention described herein, provision is preferably made for insuring retention of the bearing bosses 33 and 133, respectively, in bearing engagement with the deck of the trailer, whereby they provide a fulcrum between the gooseneck and the trailer, in the form of a pair of members carried on and projecting upwardly from the deck of the trailer and having forwardly extending flange portions spaced above the trailer deck and adapted to fit over the rear edge of the rearwardly extending plates 20 and 120, respectively. In the form of the invention shown in FIGS. 1, 2 and 3 these flanged members are identified by the reference numeral 72, and in the form of the invention shown in FIGS. 6, 7, and 8, these flanged members are identified by the reference numeral 172.

In FIGS. 9 and 10, a further structural modification is illustrated for providing a separable pivotal connection between the rearmost portion of a gooseneck and a trailer having rear support wheels only. This modification may comprise a part of either of the forms of the invention described herein. The forward end of a trailer 215 is provided with a pair of rigid, forwardly projecting pins 224 each of which is adapted to extend through an opening 229 formed in the lower end of a connector plate 226 which is supported on the downwardly curved rear end portion 214 of a gooseneck drawbar 212 for slidable movement in a vertical direction. The drawbar 212 comprises a pair of longitudinally extending, laterally spaced side beams 217, preferably I-beams, which are formed in the shape of a gooseneck. A flat plate 220 is secured across the bottom ends of the downwardly curved portions 214 of the side beams 217 and extends somewhat to the rear thereof. A vertical brace member of gusset 222 is rigidly secured between each side beam 217 and the flat plate 220. The connector plate 226 is adapted to be vertically moved relative to the gooseneck 212 by either of the devices described herein to raise and lower the forward end of the trailer 215 relative to the gooseneck 212.

Provision is made for pivotably connecting the rear edge of the plate 220 to the deck of the trailer 215. A pair of generally semi-cylindrical members 275 are secured, flat sides up, to the under side of the plate 220 at the rear corners thereof. The members 275 extend transversely of the gooseneck 212 and each is provided with a longitudinal bore 276 extending therethrough. A pair of upstanding ears 277 having transverse bores therein are rigidly secured to the deck of the trailer 215 adjacent the forward end thereof with the ears 277 being spaced apart a distance slightly greater than the width of the rear end 214 of the gooseneck 212. The rear end 214 of the gooseneck 212 is adapted to be positioned between the ears 277 with the members 275 in engagement with the deck of the trailer 215 and disposed adjacent the ears 277 whereby the bores 276 in the members 275 are aligned with the bores formed in the ears 277. A pair of headed pins 278 are then inserted through the aligned bores of the ears 277 and the members 275 and retained therein by suitable means, such as cotter pins passed through the inner ends of the pins 278. The rearmost portion of the gooseneck 212 is thus pivotably connected to the deck of the trailer 215 in a manner permitting raising and lowering of the forward end of the trailer 215 relative to the gooseneck 212. The pins 278 may easily be removed to permit detaching the rear end 214 of the gooseneck 212 from the trailer 215 whereby to allow loading and unloading of the trailer at its forward end.

It will be understood that certain changes may be made in the construction or arrangement of the gooseneck-and-trailer coupling structures disclosed herein without departing from the spirit and scope of the invention as defined in the appended claims.

I claim:

1. In combination, a gooseneck drawbar adapted to have its forward end connected to a fifth wheel of a tractor, a ram member having a vertically stepped upper surface supported on the drawbar for horizontal movement thereon, at least one plate mounted on the rear end portion of the drawbar for sliding movement relative thereto in a vertical direction, one end of said plate being adapted to releasably support the forward end of a low-bed trailer and the other end of the plate having a vertically elongated opening through which said ram member extends whereby said plate is supported on the drawbar through engagement with the upper, vertically stepped surface of said ram member, and hydraulic power means carried wholly on the drawbar, said ram member being connected to said hydraulic power means whereby actuation of said power means during transit of the interconnected tractor and trailer shifts said ram member in either of two directions and either raises or lowers said plate and thereby the forward end of the trailer relative to the drawbar.

2. In combination, a gooseneck drawbar adapted to have its rear end connected to a fifth wheel of a tractor, hydraulic power means carried wholly on the drawbar, a two-armed rocker member pivotably mounted on said drawbar and having one arm connected to said hydraulic power means, and at least one plate movably mounted in a generally vertical position on the rear end portion of the drawbar for sliding movement relative to said rear end portion in a vertical direction, vertically disposed guide members for guiding said plate in a vertically linear path, the lower end of said plate being adapted to releasably support the forward end of a low-bed trailer and the upper end of the plate being pivotably connected to the other arm of said rocker member whereby actuation of said hydraulic power means during transit of the interconnected tractor and trailer pivots said rocker member whereby to raise or lower said plate and thereby the forward end of the trailer relative to the drawbar.

3. In a removable gooseneck drawbar adapted to be connected between the fifth wheel of a tractor and the forward end of a low-bed trailer, a pair of plates vertically disposed on opposite sides of the rear portion of the gooseneck and mounted for movement relative thereto in vertically linear paths, vertically disposed guide members for guiding said plates in said vertically linear paths, means interconnecting the forward end of the trailer to the lower ends of said plates, and hydraulic power means carried wholly on the gooseneck and connected to said plates for moving the same simultaneously in said vertically linear paths to raise and lower the forward end of the trailer relative to the rear end of the gooseneck when interconnected therewith during transit of the tractor-trailer combination.

4. A gooseneck drawbar as recited in claim 3 wherein said plate moving means comprises, means defining a vertically elongated slot in the upper end of each of said plates, a hydraulic cylinder-and-piston device mounted on the gooseneck, and horizontally reciprocal ram members operably connected to the piston rod of said cylinder-and-piston device and having vertically stepped cam surfaces on the upper edges thereof, said ram members extending through said elongated slots formed in said plates with said plates being supported on the gooseneck through engagement with said upper edges of said ram members whereby reciprocal movement of said ram members through said plate openings raises and lowers said plates relative to the gooseneck.

5. A gooseneck drawbar as recited in claim 3 wherein said plate moving means comprises, a pair of hydraulic cylinder-and-piston devices mounted on the gooseneck, and a pair of rocker members pivotably mounted on the gooseneck, each of said rocker members having one arm operably connected to the piston rod of one of said cylinder-and-piston devices and the other arm operably connected to the upper end of one of said plates whereby simultaneous pivoting movement of said rocker members results from forward and rearward actuation of said pair of cylinder-and-piston devices and causes raising and lowering of said plates relative to the gooseneck.

6. In combination, a gooseneck drawbar adapted to have its forward end connected to the fifth wheel of a tractor, a rocker member pivotably mounted on said drawbar, at least one plate movably mounted in a generally vertical position on the rear end portion of the drawbar for sliding movement relative to said rear end portion in a vertical direction, vertically disposed guide members for guiding said plate in a vertically linear path, the lower end of said plate being adapted to releasably support the forward end of the trailer and the upper end of said plate being pivotably connected to one point on said rocker member, and hydraulic power means carried on the drawbar and pivotably connected to a second point on said rocker member whereby actuation of said hydraulic power means pivots said rocker member whereby to raise or lower said plate and, thus, the forward end of the trailer relative to said rear end portion of the drawbar.

7. In a removable gooseneck drawbar adapted to be connected between the fifth wheel of a tractor and the forward end of a low-bed trailer, a pair of plates movably mounted in a generally vertical position on opposite sides of the rear end portion of the drawbar for vertical movement relative thereto, vertically disposed guide members for guiding said plates in vertically linear paths, means for interconnecting the forward end of the trailer to the lower ends of said plates, hydraulic cylinder-and-piston means mounted on the drawbar, a pair of rocker members pivotably mounted on said rear end portion of the drawbar, means operably connecting said hydraulic cylinder-and-piston means to said rocker members whereby actuation of said hydraulic cylinder-and-piston means causes simultaneous and substantially identical pivoting movement of said rocker members, and means operably connecting the upper ends of said plates to said rocker members at points thereon spaced from the connections of said rocker members to said hydraulic cylinder-and-piston means whereby simultaneous pivoting movement of said rocker members causes simultaneous raising or lowering of said plates relative to the rear end portion of the drawbar and, consequently, raising or lowering of the forward end of the trailer relative to said rear end portion of the drawbar.

8. A removable gooseneck type drawbar for adjustably connecting a low-bed trailer having rear support wheels only to a tractor having a fifth wheel, comprising, a pair of laterally spaced beam members having generally horizontal forward portions and downwardly curved rear portions, rigid cross members secured between said beam members, a pair of flat plate members each of which is vertically slidable on and relative to the downwardly curved rear portion of one of said beam members, vertically disposed guide members for guiding said plate members in vertically linear paths, pin-and-socket means for interconnecting the forward end of the trailer and the lower ends of said plate members, a pair of rocker members pivotably mounted on said beam members, means pivotably connecting the upper ends of said plate members to said rocker arms, hydraulic power means mounted on said beam members, and means operably connecting said hydraulic power means to said pair of rocker members at points thereon spaced from their connections to said plate members whereby actuation of said hydraulic power means results in simultaneous raising or lowering of said plate members relative to the downwardly curved portions of said beam members and raising and lowering of the forward end of the trailer relative to the rear end of the drawbar.

9. A removable gooseneck type drawbar for connecting a low-bed trailer having rear support wheels only to a tractor having a fifth wheel comprising, a pair of laterally spaced beam members having generally horizontal forward portions and downwardly curved rear portions, rigid cross members secured between said pair of beam members, a flat plate member slidable on and relative to said downwardly curved rear portions of said drawbar in a vertically linear path, pin-and-socket means for interconnecting the forward end of the trailer and the lower end of said plate, a hydraulic piston-and-cylinder device mounted on said drawbar, and a movable member having a cam surface on its upper edge connected to said piston-and-cylinder device with said cam surface being engageable with the upper edge of an opening formed in the upper end of said flat plate member whereby to raise and lower said flat plate member relative to said drawbar upon selective actuation of said piston-and-cylinder device, said piston-and-cylinder device being controllable from within the cab of the tractor whereby to permit raising and lowering the forward end of the trailer while interconnected with said plate by said pin-and-socket means during transit of the tractor-trailer combination.

(References on following page)

References Cited in the file of this patent

UNITED STATES PATENTS

| | | | |
|---|---|---|---|
| 725,577 | Miller | Apr. 14, | 1903 |
| 2,475,761 | Shook | July 12, | 1949 |
| 2,545,584 | Meadows | Mar. 20, | 1951 |
| 2,754,987 | Kern | July 17, | 1956 |
| 2,789,714 | Norris | Apr. 23, | 1957 |
| 2,822,945 | Duffy | Feb. 11, | 1958 |
| 2,832,486 | Clark | Apr. 29, | 1958 |
| 2,944,834 | Hill | July 12, | 1960 |

FOREIGN PATENTS

| | | | |
|---|---|---|---|
| K17,510 | Germany | June 7, | 1956 |